(12) United States Patent
Makhijani (10) Patent No.: US 12,411,592 B2
(45) Date of Patent: Sep. 9, 2025

(54) PATTERN SEARCH IN IMAGE VISUALIZATION

(71) Applicant: Schlumberger Technology Corporation, Sugar Land, TX (US)

(72) Inventor: Hemantkumar Prakashbhai Makhijani, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 102 days.

(21) Appl. No.: 18/546,791

(22) PCT Filed: Feb. 15, 2022

(86) PCT No.: PCT/US2022/070667
§ 371 (c)(1),
(2) Date: Aug. 17, 2023

(87) PCT Pub. No.: WO2022/178505
PCT Pub. Date: Aug. 25, 2022

(65) Prior Publication Data
US 2024/0126419 A1    Apr. 18, 2024

(30) Foreign Application Priority Data
Feb. 18, 2021 (IN) .............................. 202121006901

(51) Int. Cl.
*G06F 3/0482* (2013.01)
*G06F 3/04842* (2022.01)
(Continued)

(52) U.S. Cl.
CPC ........ *G06F 3/04842* (2013.01); *G06F 16/583* (2019.01); *G06F 16/538* (2019.01)

(58) Field of Classification Search
CPC .............. G06F 3/04842; G06F 3/0482; G06F 3/04845; G06F 16/583; G06F 16/538;
(Continued)

(56) References Cited

U.S. PATENT DOCUMENTS

| 10,900,351 B2 | 1/2021 | Deffenbaugh |
| 2009/0167556 A1 | 7/2009 | Signer |

(Continued)

FOREIGN PATENT DOCUMENTS

WO      2019236339 A1    12/2019

OTHER PUBLICATIONS

Pattern Matching Algorithms, https://www.rsipvision.com/pattern-matching-algorithms/, Assessed on Nov. 5, 2024, 5 Pages.

(Continued)

*Primary Examiner* — Jeanette J Parker
(74) *Attorney, Agent, or Firm* — Jeffrey D. Frantz (57) ABSTRACT

A method may include displaying, in a graphical user interface (GUI) of a display device, an image generated from a well log, receiving, via the GUI, a selection of a portion of the image, obtaining, for the portion of the image, search metadata, and deriving, from the portion of the image, a search pattern including a constraint on a value of a search parameter. The method may further include performing, using the search pattern, a search within the image to obtain search results including matching portions of the image, marking, in the GUI, locations of the search results within the image, receiving, via the GUI, a selection of a search result, and presenting, in the GUI, the search result.

20 Claims, 7 Drawing Sheets

(51) Int. Cl.
*G06F 16/583* (2019.01)
*G06F 16/538* (2019.01)

(58) Field of Classification Search
CPC ..... G06F 16/532; G06F 16/54; G06V 10/235; G06V 20/00
See application file for complete search history.

(56) References Cited

U.S. PATENT DOCUMENTS

| | | |
|---|---|---|
| 2010/0188406 A1 | 7/2010 | Kincaid |
| 2011/0091078 A1 | 4/2011 | Kherroubi |
| 2014/0123046 A1 | 5/2014 | Adegbola |
| 2014/0379317 A1* | 12/2014 | Sanden ............... G06T 3/40 703/10 |
| 2017/0372490 A1 | 12/2017 | Kherroubi |
| 2018/0123820 A1* | 5/2018 | Kim ............... H04L 12/2809 |
| 2019/0286934 A1* | 9/2019 | Lai ............... G06T 7/11 |
| 2020/0074588 A1* | 3/2020 | Fouda ............... G06F 16/587 |
| 2022/0010675 A1* | 1/2022 | Yin ............... G06T 5/60 |
| 2022/0197248 A1* | 6/2022 | Weinberg ............... G06N 20/00 |
| 2022/0197951 A1* | 6/2022 | Stober ............... G06F 16/904 |

OTHER PUBLICATIONS

Template matching, https://en.wikipedia.org/wiki/Template_matching, Jun. 30, 2024, 5 Pages.
Li et al., Pushing the limit of earthquake detection with distributed acoustic sensing and template matching: A case study at the Brady geothermal field, Geophysical Journal International, vol. 215, Sep. 3, 2018, pp. 1583-1593.
Wang et al., Automated gamma-ray log pattern alignment and depth matching by machine learning, Interpretation, vol. 8, Issue 3, Aug. 2020, pp. 25-34.
Svensson et al., ProViz: a tool for explorative 3-D visualization and template matching in electron tomograms, Computer Methods in Biomechanics and Biomedical Engineering: Imaging Visualization, vol. 5, Issue 6, May 13, 2016, pp. 446-454.
Search Report and Written Opinion of International Patent Application No. PCT/US2022/070667 dated on May 16, 2022, 8 Pages.
Extended Search Report issued in European Patent Application No. 22757158.5 dated Dec. 12, 2024, 7 pages.

* cited by examiner

PATTERN SEARCH IN IMAGE VISUALIZATION

CROSS REFERENCE PARAGRAPH

This application is a National Stage Entry of International Patent Application No. PCT/US2022/070667, filed Feb. 15, 2022, entitled "PATTERN SEARCH IN IMAGE VISUALIZATION," which claims the benefit of India Non-Provisional application No. 202121006901, entitled "PATTERN SEARCH IN IMAGE VISUALIZATION," filed Feb. 18, 2021, the disclosure of which is hereby incorporated herein by reference.

BACKGROUND

In the oil and gas domain, various software tools provide a visualization capability to facilitate analysis and understanding of patterns in images generated from sub-surface geological data, such as borehole and lithography data. Such tools render images on the screen, with various color processing or logic, to help users visualize, understand or analyze information accurately. However, such tools may provide a limited capability to search for images.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including displaying, in a graphical user interface (GUI) of a display device, an image generated from a well log, receiving, via the GUI, a selection of a portion of the image, obtaining, for the portion of the image, search metadata, and deriving, from the portion of the image, a search pattern including a constraint on a value of a search parameter. The method further includes performing, using the search pattern, a search within the image to obtain search results including matching portions of the image, marking, in the GUI, locations of the search results within the image, receiving, via the GUI, a selection of a search result, and presenting, in the GUI, the search result. Other aspects of the disclosure will be apparent from the following description and the appended claims.

BRIEF DESCRIPTION OF DRAWINGS

FIG. 2.1 and FIG. 2.2 show diagrams of a system in accordance with one or more embodiments.

FIGS. 4.1 and 4.2 show examples in accordance with one or more embodiments.

FIGS. 5.1 and 5.2 show diagrams of a computing system in accordance with one or more embodiments.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
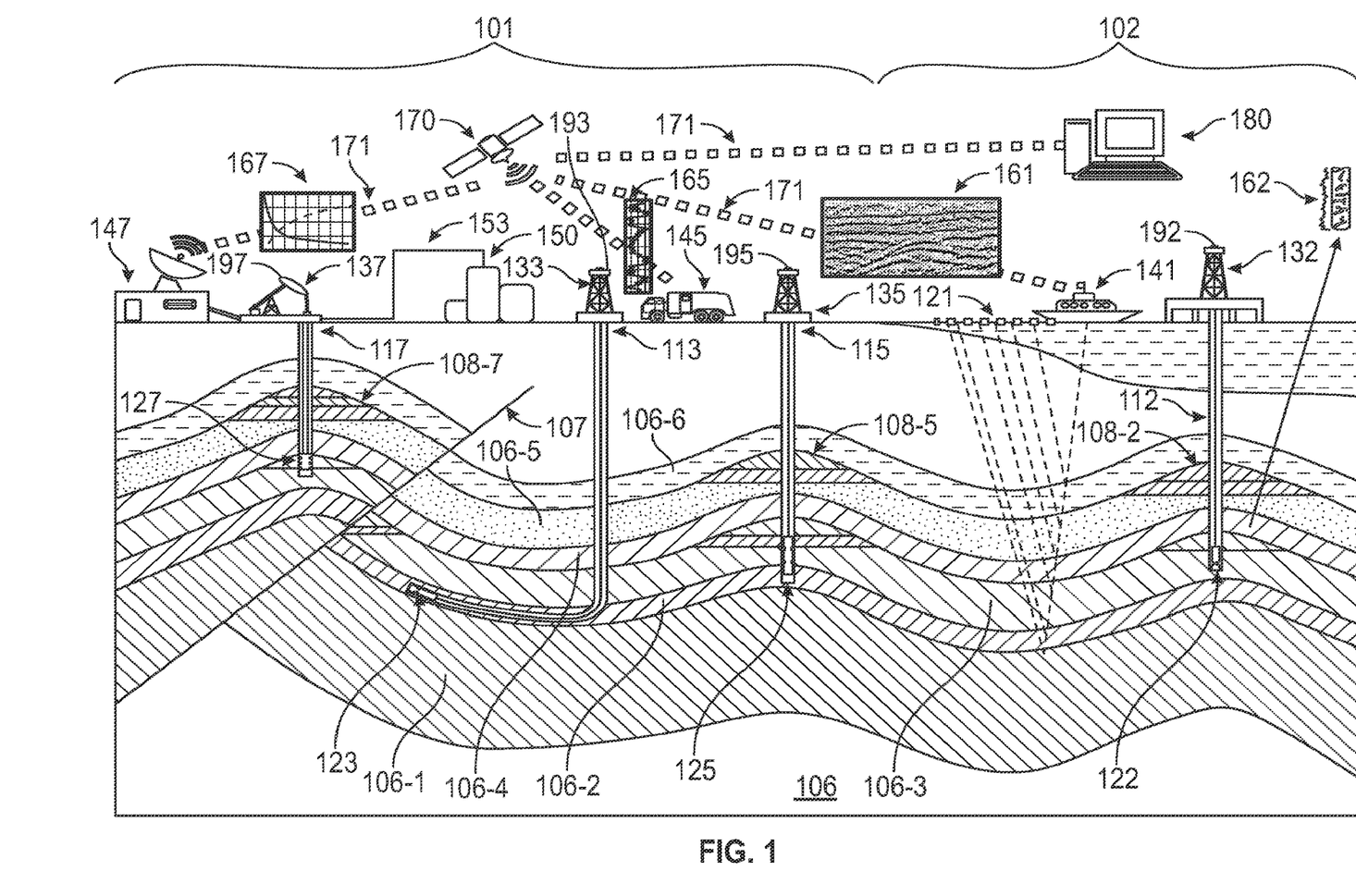
FIG. 1 shows a diagram of a field in accordance with one or more embodiments.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of E&P operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined.

Figure 51:
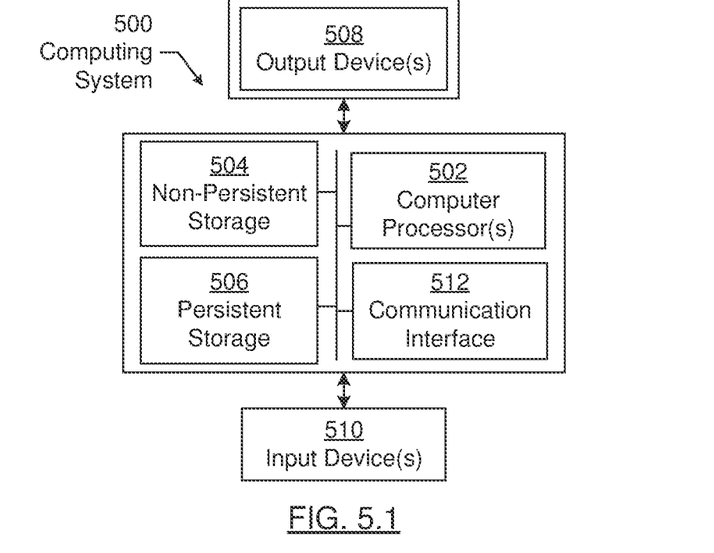
Figure 52:
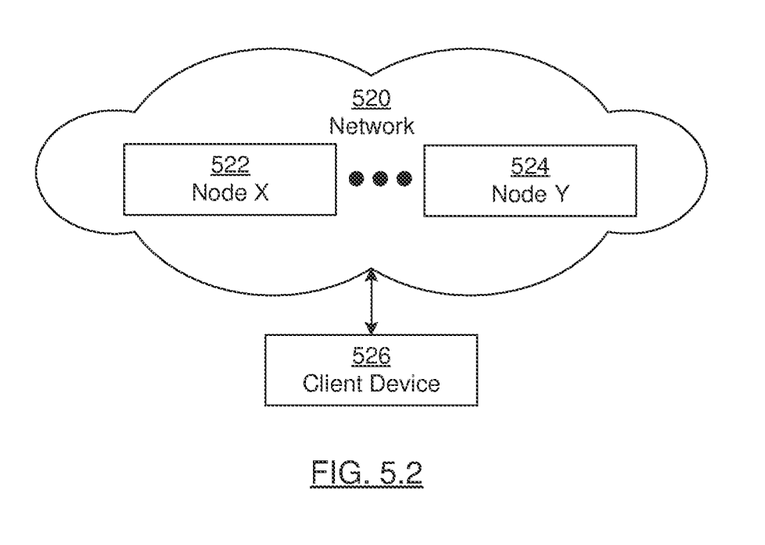

In one or more embodiments, the E&P computer system (180) is implemented by an E&P services provider by deploying applications with a cloud based infrastructure. As an example, the applications may include a web application that is implemented and deployed on the cloud and is accessible from a browser. Users (e.g., external clients of third parties and internal clients of the E&P services provider) may log into the applications and execute the functionality provided by the applications to analyze and interpret data, including the data from the surface units (141), (145), and (147). The E&P computer system and/or surface unit may correspond to a computing system, such as the computing system shown in FIGS. 5.1 and 5.2 and described below.

As discussed in FIG. 1, the various data acquisition tools present the oilfield information to the E&P computer system. The E&P computer system analyzes and aggregates and presents the oilfield information. For example, the E&P computer system may provide various graphs, simulations, and other 2D and 3D images directly or indirectly to a user. Continuing this example, the data captured may correspond to depths of hundreds or thousands of feet. The user may interact with the images in order to understand the oilfield and extract hydrocarbons. During such interaction, the interactions are performed in order for a user to analyze and understand different field operations. For example, the user may want to search within the same image or search different images in order to identify similarities and determine field operations. However, because of the size of the images and the number of images, general user interfaces may not provide the search functionality. The size of the image may depend on the depth of the drilling operation.

In general, embodiments of the disclosure are directed to executing a search pattern on an image. The search pattern may include constraints on the values of search parameters. A well log is a series of measurement values of one or more properties in and around a well. A well log may include multiple well log channels. A well log channel corresponds to a particular property of the well log. A well log may correspond to one or more images. For example, the images may be lithographic images or may represent borehole data.

A search pattern may be related in storage to search metadata. The search metadata are constraints on the values of properties of the well log not displayed in the image. Thus, whereas the search parameters constrain properties within the displayed image, the search metadata constrains properties that are not displayed in the image. For example, the search metadata may include a separate set of well log data used to perform image analysis (e.g., a search for hydrocarbons).

A search pattern may be derived from a portion of the image selected by the user and/or from search metadata. The GUI provides functionality to edit the search pattern and/or search metadata. The GUI includes functionality to present search results. The search results including portions of the image matching the search pattern may be generated by applying a pattern matching model to the image and the search pattern. The pattern matching model may generate the search results using scale-invariant and/or position-invariant features (e.g., shapes, textures, colors, etc.) extracted from the image. The pattern matching model may further generate the search results using mathematical matching algorithms (e.g., including various mathematical curve fitting techniques such as nearest neighbor, linear or non-linear interpolation, etc.). The GUI provides functionality to navigate the search results.

Figure 21:
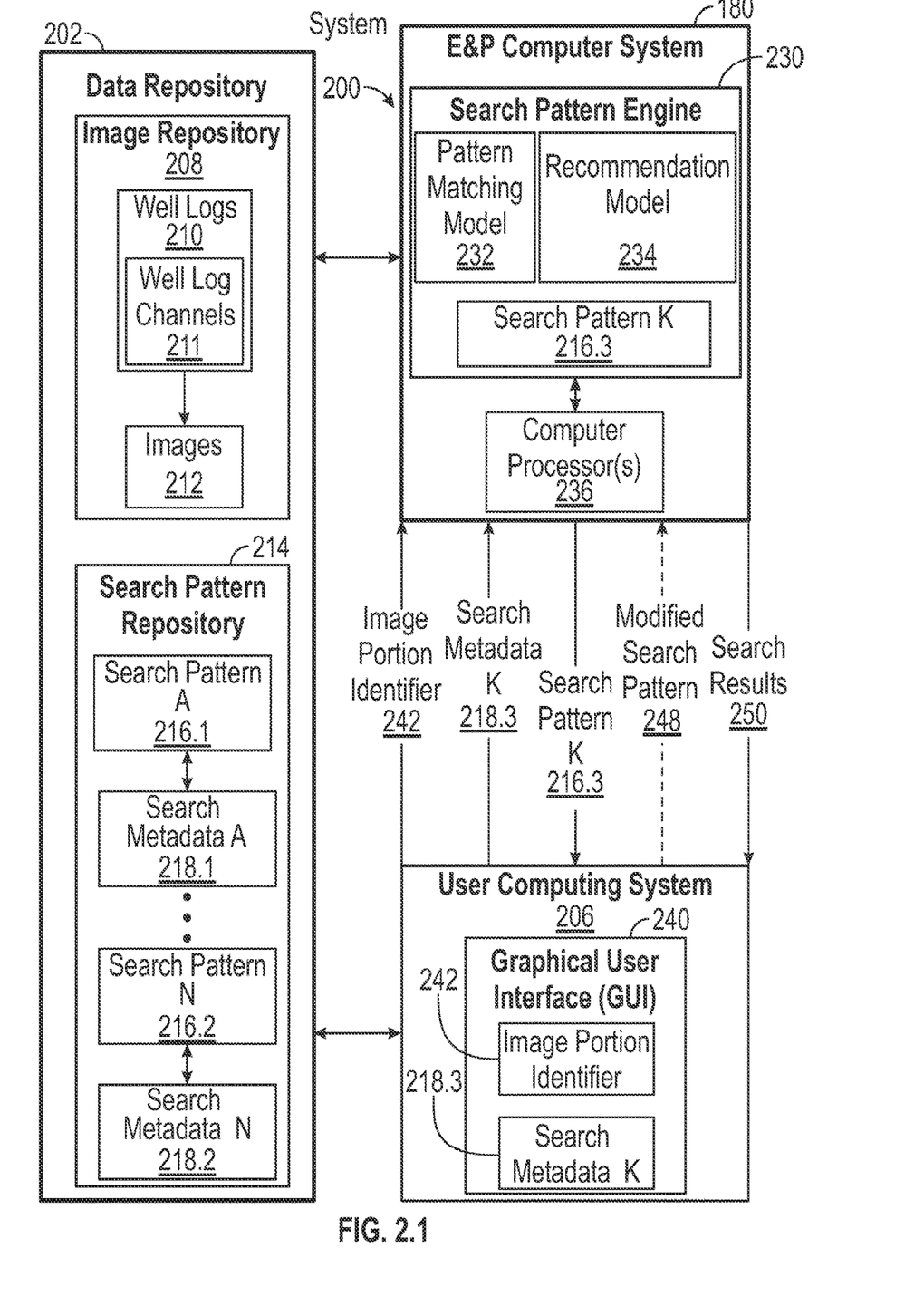

FIG. 2.1 shows a diagram of a system (200) in accordance with one or more embodiments. As shown in FIG. 2.1, the system (200) includes multiple components, such as the data repository (202), the E&P computer system (180), and a user computing system (206). Each of these components is described below.

The data repository (202) is any type of storage unit and/or device (e.g., a file system, database, collection of tables, or any other storage mechanism) for storing data. Further, the data repository (202) may include multiple different storage units and/or devices. The multiple different storage units and/or devices may or may not be of the same type or located at the same physical site. The data repository (202) may be accessed online via a cloud service (e.g., Amazon Web Services (AWS), Egnyte, Azure, etc.) or through third-party applications.

The data repository (202) includes an image repository (208) and a search pattern repository (214). The image repository (208) includes well logs (210) and images (212). A well log (210) is a set of measurements taken along a length of a borehole. The measurements in the well log (210) are of the properties of the geological formation, fluids, and/or other aspects of the wellbore. In one or more embodiments, a well log (210) includes well log channels (211). Each well log channel (211) is a portion of a well log (210) that has a value for a specific type of property. The property may correspond to a physical measurement (e.g., measured using a sensor). Alternatively, the property may correspond to a derived (e.g., calculated) value based on the values of one or more other properties. A derived property may be used in the preparation and/or analysis of the image (212). Examples of properties may include temperature, pressure, density, nuclear magnetic resonance (e.g., gamma ray), spontaneous potential (SP), caliper, photoelectric absorption, porosity, contrast index, electrical (e.g., resistivity), true vertical depth (TVD), weight on drill bit, surface torque, mud flow, hook load, acoustic, corrosion, and other properties of rocks and/or their contained fluids, etc.

A well log (210) may correspond to one or more images (212). For example, the images (212) may be lithographic images or may represent borehole data. An image (212) may be represented as a bitmap (e.g., using the Joint Photographic Experts Group (JPEG) or Portable Network Graphic (PNG) format). The images (212) may be generated from the well log (210) using a visualization tool. For example, the images (212) may be graphs or charts generated from the well log (210). In one or more embodiments, an image visually represents values corresponding to one or more well log channels (211). Images may be displayed after applying image processing algorithms such as histogram, gaussian, etc. using a variety of static or dynamic ranges. For example, the image processing algorithms may be applied to smooth or shorten the image, or for any other purpose.

The search pattern repository (214) includes search patterns (216.1, 216.2) and search metadata (218.1, 218.2). In one or more embodiments, a search pattern (216.1) includes one or more constraints on the values of one or more search parameters. A search parameter is a property of the well log (210) that is displayed in the image (212). The value of the search parameter may be constrained when performing one or more searches. For example, a constraint may specify, for a temperature property, a range of values between 20 and 30 degrees Centigrade. A search parameter may be associated with a confidence level (e.g., a threshold confidence level) for each search result generated by the pattern matching model (232), as described below. A constraint may specify a specific value of a search parameter. Alternatively, a constraint may specify a range of values (e.g., defined by a maximum value and/or a minimum value). In one or more embodiments, a search pattern specifies a collection of values in a specific order. The order and values are defined by the portion of the search image selected. For example, a search pattern may specify a temperature change from 36 degrees to 20 degrees to 37 degrees. Each unit (i.e., value) in the search pattern may be defined as a single value or a range of values. Thus, if the user selects a portion of the search image, the pattern matching model (232) may extract a search pattern. In the example above, if the user selects a portion of the search image showing a temperature change from 36 degrees to 20 degrees to 37 degrees, the pattern matching model may extract a search pattern composed of ranges including 35-40 degrees, 15-25 degrees, and 35-40 degrees.

A search pattern (216.1) may be related in storage to search metadata (218.1). In one or more embodiments, the search metadata (218.1) includes one or more constraints on the values of one or more properties of the well log (210) not displayed in the image (212). For example, the search metadata (218.1) may include constraints on the values included in one or more well log channels of the well log (210) not displayed in the image (212). Continuing this example, if the image (212) displays values corresponding to a first well log channel (e.g., a pressure channel) and the image (212) does not display values corresponding to a second well log channel (e.g., a resistivity channel), then the search pattern may include constraints on the values of the first well log channel, and the search metadata may include constraints on the values of the second well log channel.

Alternatively or additionally, the search metadata (218.1) may include a description of the context and/or goal of the search pattern (216.1). For example, the description may include one or more attribute/value pairs. Continuing this example, the attribute may be "rock type" and the value may be "limestone." The search metadata (218.1) may be calculated and/or updated by the pattern matching model (232) (e.g., based on the usage of the search pattern (216.1)).

Continuing with FIG. 2.1, the user computing system (206) includes a graphical user interface (GUI) (240). The GUI (240) may be rendered and displayed within a local desktop software application or the GUI (240) may be generated by a remote web server and transmitted to a user's web browser executing locally on a desktop or mobile device. The GUI (240) includes functionality to display one or more images (212). The GUI (240) includes functionality to receive an image portion identifier (242) corresponding to a selection of a portion of an image (212) from a user. The image portion identifier (242) is any identifier corresponding to the portion of the image (212) selected by the user. For example, the user may select the portion of the image (212) by enclosing the portion of the image (212) within a bounding box. The bounding box indicates a location (e.g., a region) within the image (212). The bounding box may define maximum and/or minimum values of one or more properties of one or more well log channels (211). The bounding box may also be related to depth levels at which the drilling operation was performed. The GUI (240) includes functionality to receive, from the user, search metadata (218.3) corresponding to the portion of the image (212) selected by the user.

The E&P computer system (180) includes a search pattern engine (230) and computer processor(s) (236). The E&P computer system (180) may be executed on a computing system (500) shown in FIG. 5.1 connected to a network (520) as shown in FIG. 5.2. The search pattern engine (230) includes functionality to derive a search pattern (216.3) from the portion of the image (212) selected by the user and/or the search metadata (218.3). The search pattern engine (230) includes functionality to generate search results (250) matching the search pattern (216.3). The search results (250) include portions of the image (212) matching the search pattern (216.3).

In one or more embodiments, the search pattern engine (230) includes functionality to generate the search results (250) by applying a pattern matching model (232) to the image (212) and the search pattern (216.3). The pattern matching model (232) may generate the search results (250) using features extracted from the image (212). For example, the features may be scale-invariant and/or position-invariant features such as shapes, textures, colors, etc.

The pattern matching model (232) may be a machine learning model based on deep learning algorithms. Deep learning, also known as deep structured learning or hierarchical learning, is part of a broader family of machine learning methods based on learning data representations, as opposed to task-specific algorithms. For example, the pattern matching model (232) may identify portions of the image (212) matching the search pattern (216.3) using Harris corners and/or histogram-based matching. The pattern matching model (232) may further include functionality to generate a confidence level for each search result that represents a probability that the search result matches the search pattern (216.3).

In one or more embodiments, the search pattern engine (230) includes a recommendation model (234). The recommendation model (234) may be implemented as various types of deep learning classifiers and/or regressors based on neural networks (e.g., based on convolutional neural networks (CNNs)), random forests, stochastic gradient descent (SGD), a lasso classifier, gradient boosting (e.g., XGBoost), bagging, adaptive boosting (AdaBoost), ridges, elastic nets, or Nu Support Vector Regression (NuSVR). The recommendation model (234) may be trained using historical search patterns each labeled with search metadata. The trained recommendation model (234) may thus learn correlations between historical search patterns and search metadata. In one or more embodiments, the recommendation model (234) may be further trained using matching results corresponding to the historical search patterns.

In one or more embodiments, the trained recommendation model (234) includes functionality to recommend search metadata (218.3) corresponding to the search pattern (216.3) derived by the search pattern engine (230) (e.g., based on learned correlations between historical search patterns and search metadata). Thus, the search pattern engine (230) includes functionality to send the recommended search metadata (218.3) to the user via the GUI (240).

Alternatively, the recommendation model (234) may be trained using historical well log values in order to learn correlations between the values of different well log channels. For example, correlations between the values of different well log channels may be useful when recommending search metadata corresponding to a well log channel not displayed in an image (212). The recommendation model (234) may include functionality to predict matching locations in different wells and/or different images (e.g., lithology or borehole images).

In one or more embodiments, the trained recommendation model (234) includes functionality to recommend a modification to the search pattern (216.3) using the search metadata (218.3). For example, the search pattern (216.3) may be based on data from a first channel of a well log and the search metadata (218.3) may be based on data from a second channel of the well log.

In one or more embodiments, the flow of data between the GUI (240) and the search pattern engine (230) in FIG. 2.1 may be summarized as follows:

The GUI (240) transmits the image portion identifier (242) and search metadata (218.3) to the search pattern engine (230).

The search pattern engine (230) transmits the search pattern (216.3) to the GUI (240).

Optionally, the GUI (240) transmits a modified search pattern (248) (e.g., received from the user) to the search pattern engine (230).

Figure 22:
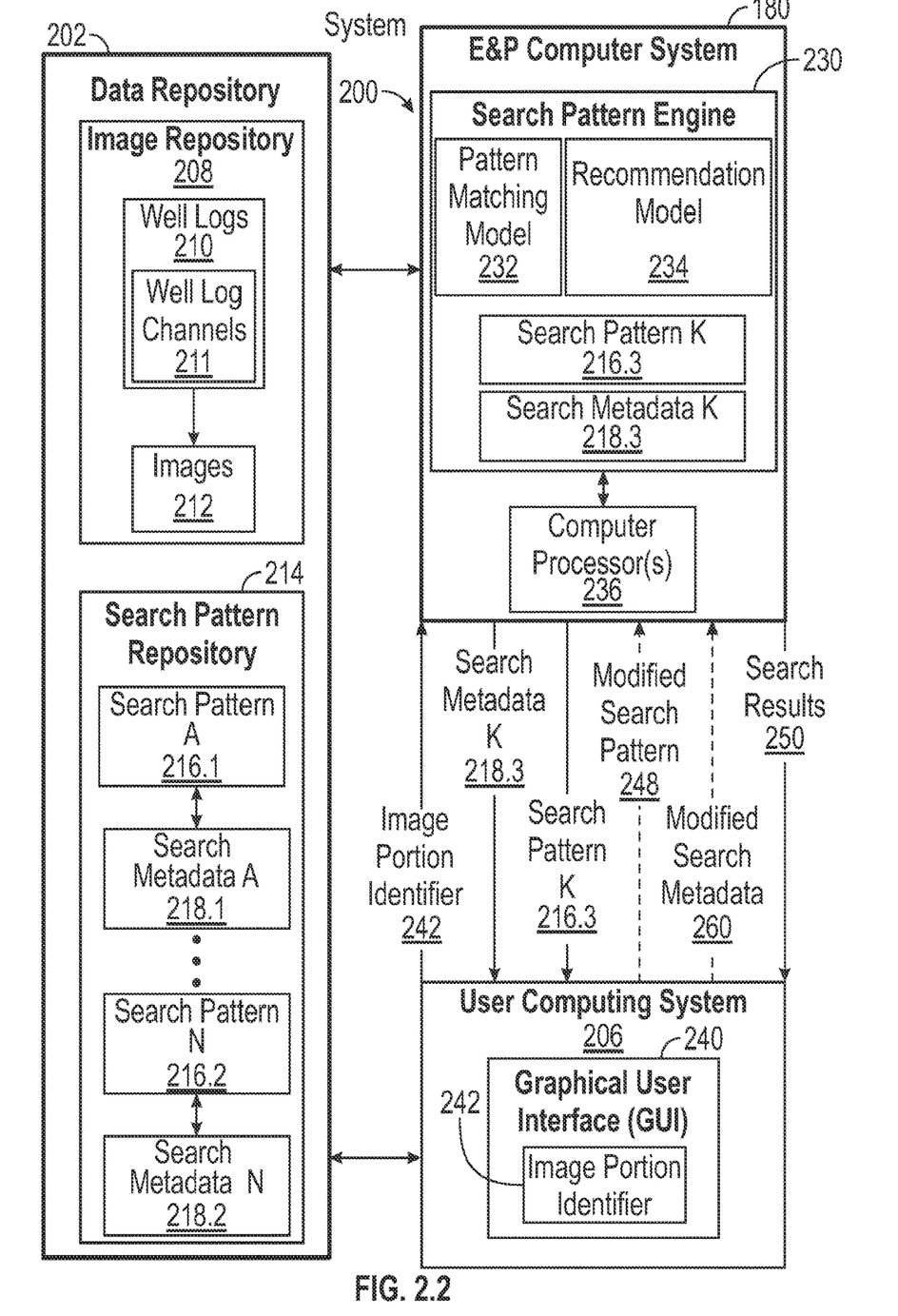

In contrast, FIG. 2.2 shows an alternate flow of data between the GUI (240) and the search pattern engine (230):

The GUI (240) transmits the image portion identifier (242) to the search pattern engine (230).

The search pattern engine (230) transmits search metadata (218.3) and the search pattern (216.3) to the GUI (240). That is, the search pattern engine (230) may use the recommendation model (234) to recommend search metadata (218.3) corresponding to the search pattern (216.3).

Optionally, the GUI (240) transmits a modified search pattern (248) and/or modified search metadata (260) (e.g., received from the user) to the search pattern engine (230).

While FIG. 2.1 and FIG. 2.2 show a configuration of components, other configurations may be used without departing from the scope of the disclosure. For example, various components may be combined to create a single component. As another example, the functionality performed by a single component may be performed by two or more components.

Figure 3:
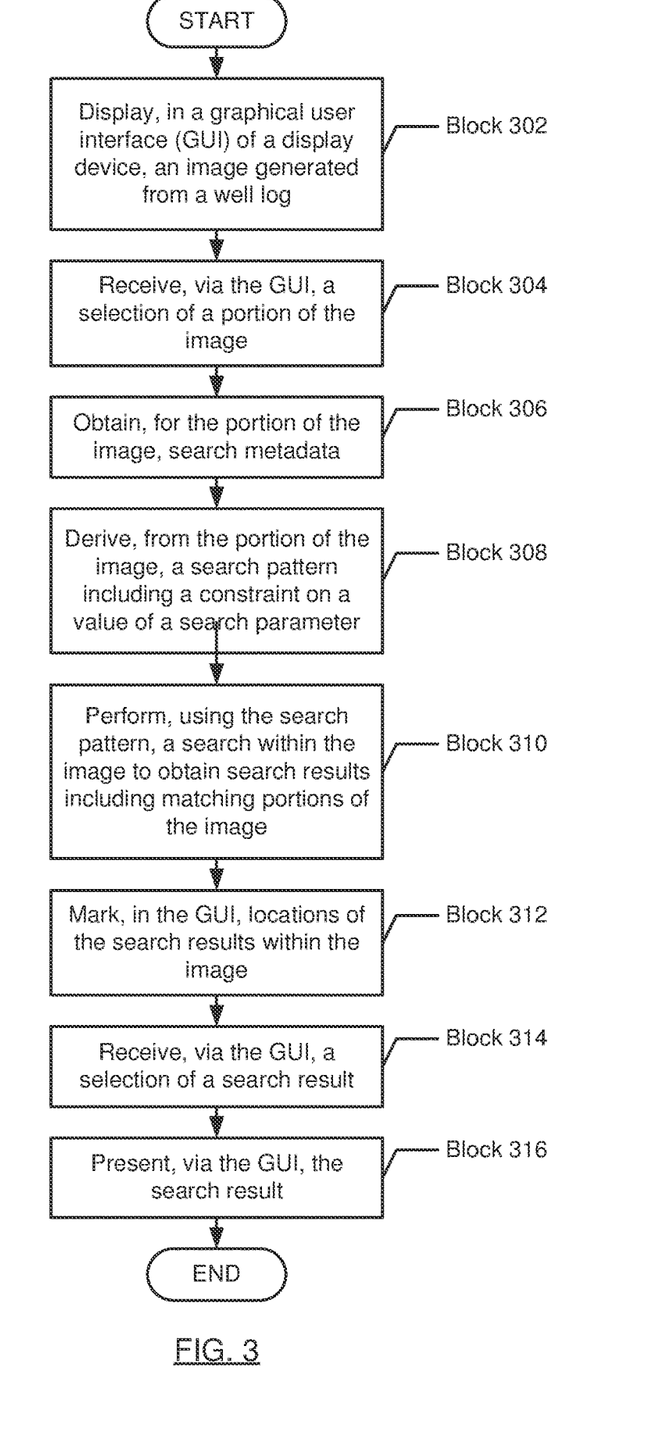
FIG. 3 shows a flowchart in accordance with one or more embodiments.

FIG. 3 shows a flowchart in accordance with one or more embodiments of the disclosure. The flowchart depicts a process for process for executing a search pattern on an image. One or more of the steps in FIG. 3 may be performed by the components (e.g., the search pattern engine (230) of the E&P computer system (180) and the GUI (240) of the user computing system (206)), discussed above in reference to FIG. 2.1 and FIG. 2.2. In one or more embodiments of the disclosure, one or more of the steps shown in FIG. 3 may be omitted, repeated, and/or performed in parallel, or in a different order than the order shown in FIG. 3. Accordingly, the scope of the disclosure should not be considered limited to the specific arrangement of steps shown in FIG. 3.

Initially, in Block 302, an image generated from a well log is displayed in a GUI of a display device. The image may visually represent values corresponding to a property of a first well log channel of the well log. For example, the first well log channel may correspond to a temperature property. The image may be displayed in the GUI by executing a visualization tool.

In Block 304, a selection of a portion of the image is received via the GUI. The selection may correspond to a bounding box enclosing the portion of the image. The GUI may request confirmation from the user regarding the locations and/or the depths corresponding to the bounding box. For example, the bounding box may define a range of values of a property of the first well log channel Continuing this example, for a temperature property, the range of values may be between 20 and 30 degrees Centigrade.

In Block 306, search metadata is obtained for the portion of the image. For example, the search metadata may correspond to a property (e.g., resistivity) of a second well log channel of the well log. Continuing this example, the property of the second well log channel may be excluded from the portion of the image. In other words, the values corresponding to the property of the second well log channel may not be displayed in the portion of the image. As another example, the search metadata may be an attribute/value pair, such as "rock type"/"limestone" or other structural well log information such as permeability and/or porosity ranges.

The search metadata may be obtained from the GUI, in which case the recommendation model may then recommend a modification to the search metadata obtained from the GUI. Continuing the example above, the recommendation model may recommend a modified range of values for the property of the second well log channel that is correlated with the range of values of the property of the first well log channel.

Alternatively, the search metadata may be obtained from the search pattern engine, in which case the GUI may then receive, from a user, a modification to the search metadata obtained from the search pattern engine. For example, the search pattern engine may retrieve the search metadata from the data repository using the location and/or size of the image selected by the user via the GUI. Still alternatively, the search metadata may be obtained from the recommendation model, in which case the GUI may then receive, from a user, a modification to the search metadata obtained from the recommendation model. For example, the recommendation model may learn relationships between values of different well log channels.

In Block 308, a search pattern including a constraint on a value of a search parameter is derived from the portion of the image. Continuing the example above, the search pattern engine may derive the constraint from the range of values defined by the bounding box enclosing the portion of the image. If the selected portion of the image uses multiple different values, the extracted search pattern is determined from the values of the selected portion. For example, each value in the selected portion is added as a value to the search pattern in the same order. Prior to adding the value, the value may be mapped to a range of values.

In one or more embodiments, the search pattern engine applies the recommendation model to recommend a modification to the search pattern that modifies the constraint on the value of the search parameter (e.g., a constraint on the value of a property represented in the first well log channel). The recommendation model may recommend the modification using correlations learned from training data that includes historical search patterns each labeled with search metadata. The search pattern engine recommends the modified search pattern to the user via the GUI. Continuing the example above, the modified constraint may include a modification to the range specified by the constraint. Still continuing the example above, the recommended modification to the range may be: between 25 and 30 degrees Centigrade, between 23 and 26 degrees Centigrade, between 40 and 60 degrees Centigrade, etc.

In Block 310, a search is performed within the image using the search pattern to obtain search results including matching portions of the image. The search pattern engine may use the pattern matching model to perform the matching. For example, the pattern matching model may perform the matching using features extracted from the portion of the image. Continuing this example, for each possible matching portion of the image, the search pattern engine determines whether the possible matching portion satisfies the features of the search pattern and search metadata. If at least one property value fails to match, the search pattern engine may discontinue processing the current possible matching portion and instead begin processing the next possible matching portion of the image.

The search pattern and the search metadata may be saved in a search pattern repository. The saved search pattern may be subsequently proposed for use in a search of a second image corresponding to second search metadata that is similar to the "first" search metadata obtained in Block 306 above. For example, as described in the following two paragraphs, if a user selects search metadata similar to the saved search metadata, the saved search pattern may be proposed to the user. The second image may be generated from the same well log as the image displayed in Block 302 above. Alternatively, the second image may be generated from a different well log as the image displayed in Block 302 above.

The search pattern engine may determine that the second search metadata that is similar to the first search metadata based on generating a similarity score between the second search metadata and the first search metadata. In one or more embodiments, the similarity score is based on whether the second search metadata and the first search metadata refer to the same property of a well log, and the degree of overlap between a second range of values corresponding to the second search metadata and a first range of values corresponding to the first search metadata. For example, a temperature range of 20-30 degrees may have a 50% overlap with a temperature range of 25-35 degrees. The search pattern engine may determine that the second search metadata is similar to the first search metadata based on the similarity score exceeding a threshold.

In response to the similarity score exceeding the threshold, the search pattern engine retrieves the search pattern corresponding to the first search metadata. The search pattern engine may then make a proposal, via the GUI, to perform a search within the second image using the search pattern. Upon receiving, via the GUI, an acceptance of the proposal, the search pattern engine performs, using the search pattern, a search within the second image to obtain search results including matching portions of the second image.

For example, the search pattern engine may generate possible matching portions of the image as follows:

Define a "move increment" to be a fraction (e.g., $\frac{1}{3}^{rd}$) of the bounding box size (based on the selection of the portion of the image), in terms of depth. The fraction determines the level of accuracy, and may be customizable by the user.

Generate search results as follows, while moving through the image depth by performing a series of move increments, noting the search metadata at the corresponding depth level.

Capture a test pattern calculated after performing each move increment.

Compare the test pattern with the search pattern.

Specify a permitted result margin that corresponds to a strength of match. The permitted result margin is an internal (e.g., configurable) value. For example, the permitted result margin may be between 75% and 100%.

Compare the basic data (e.g., image, logs) with respect to search metadata corresponding to the search pattern to obtain a comparison result.

If image bytes are available for comparison, then perform the comparison using any image comparison technique (e.g., a pixel-by-pixel comparison or a scale-invariant comparison) because the bounding box selected by the user and the bounding box enclosing the test pattern will have the same size. As a future enhancement, the size of the bounding box for the test pattern may exceed the size of the bounding box selected by the user (e.g., to increase the speed of calculating search results).

If the comparison result satisfies the permitted result margin, the test pattern is added to the search results. The test pattern may be used as additional training data for the pattern matching model.

Otherwise, if the comparison result fails to satisfy the permitted result margin, a new test pattern may be generated using a larger fraction (e.g., ½) of the bounding box size. Optionally, a new test pattern may be generated by adjusting the position of the bounding box (e.g., by moving the bounding box upward).

Figure 42:
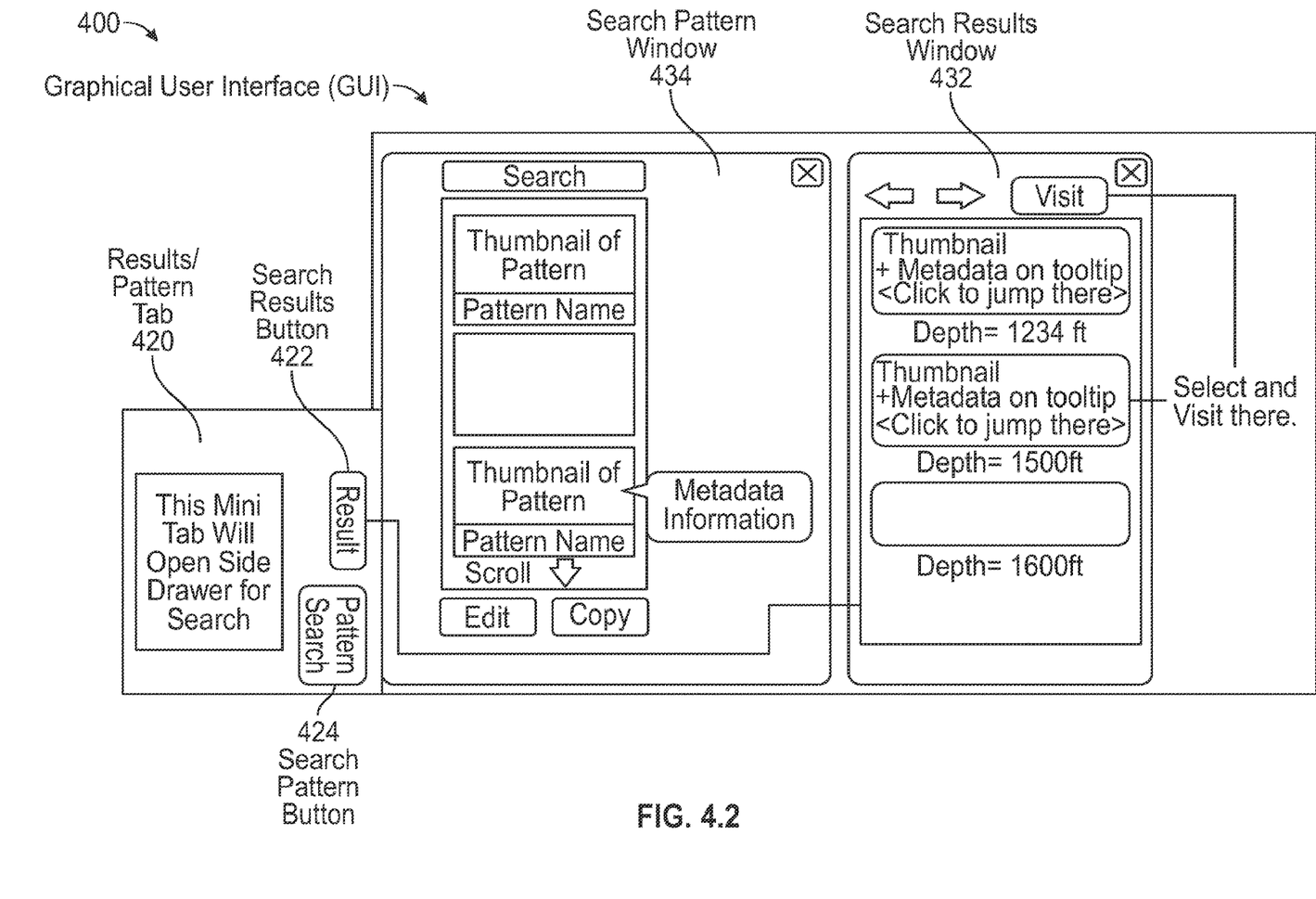

In Block 312, locations of the search results within the image are marked in the GUI. For example, the search results may be displayed in the GUI using thumbnails corresponding to the search results, as shown in the search results window (432) of FIG. 4.2. The thumbnails may be selectable miniature representations of search results that serve as markers or placeholders for the search results.

In Block 314, a selection of a search result is received via the GUI. For example, a search result may be selected by clicking on a thumbnail displayed in the search results window (432) of FIG. 4.2.

In Block 316, the search result is presented in the GUI. For example, the search result may be presented by displaying the matching portion of the image corresponding to the selected search result from Block 314 above in the search results window (432) of FIG. 4.2. For example, the user interface may scroll from a current portion of the image to the matching portion of the image. As another example, the search result may be presented by generating a new window (e.g., a popup window) to display the matching portion of the image corresponding to the selected search result.

Figure 41:
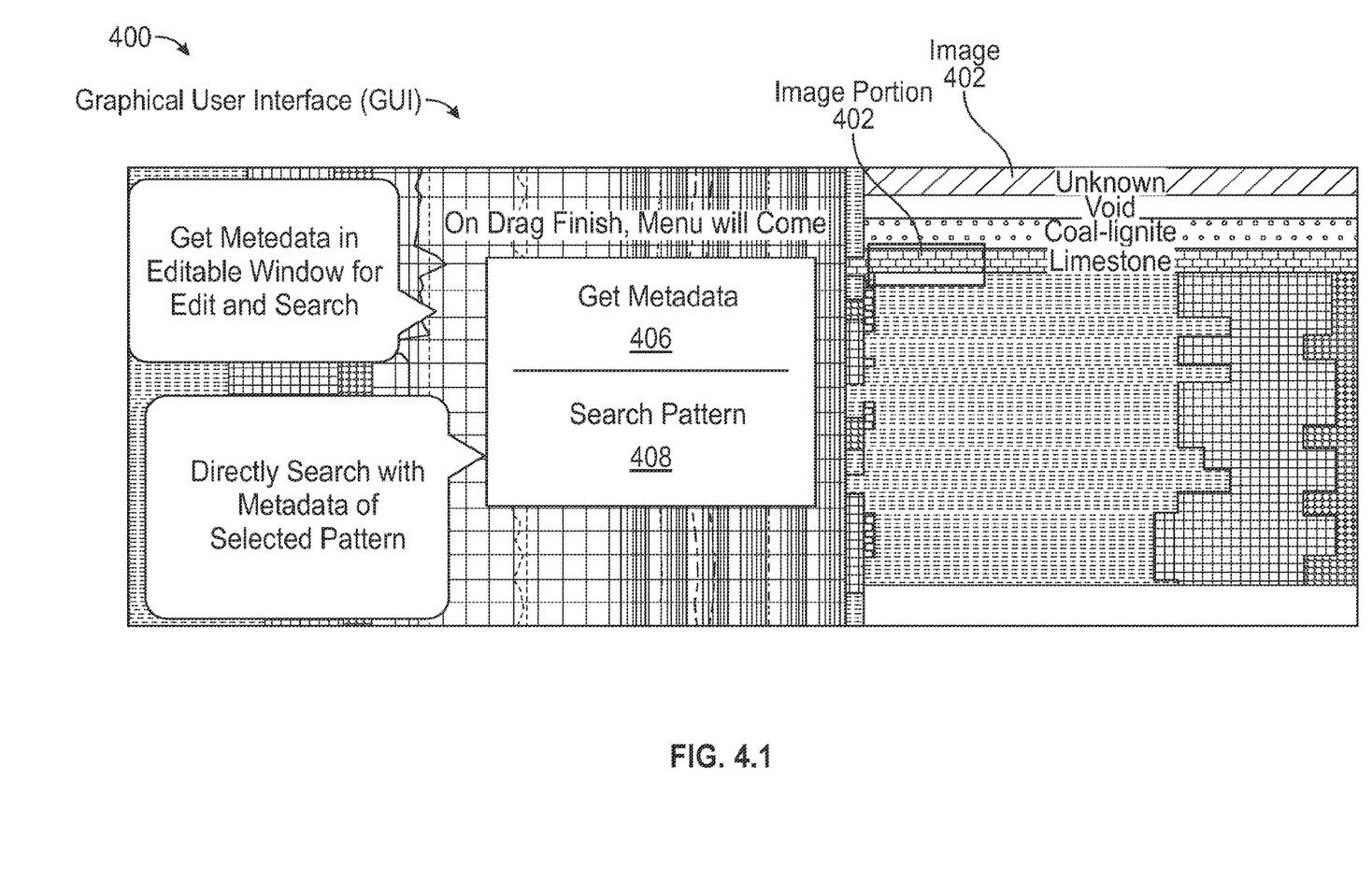

FIG. 4.1 and FIG. 4.2 show an implementation example(s) in accordance with one or more embodiments. The implementation example(s) are for explanatory purposes and not intended to limit the scope of the disclosure. One skilled in the art will appreciate that implementation of embodiments of the disclosure may take various forms and still be within the scope of the disclosure.

In particular, FIG. 4.1 shows a graphical user interface (GUI) (400) ((240) in FIG. 2.1 and FIG. 2.2) of a user computing system. The GUI (400) includes an image (402) ((212) in FIG. 2.1 and FIG. 2.2). The image (402) includes an image portion (404) selected by a user within a bounding box. Once the image portion (404) is selected (e.g., once the bounding box is completed), a menu opens that includes a "get metadata" (406) window from which search metadata corresponding to the image portion (404) may be obtained from the search pattern engine. The user may then edit the search metadata in the "get metadata" (406) window. The menu further includes a "search pattern" (408) window from which proposed search patterns corresponding to the image portion (404) may be obtained from the recommendation model. The proposed search patterns are displayed in a search pattern window (434). The user may then edit the search pattern in the "search pattern" (408) window. The user may initiate, via the GUI (400), a search using the (possibly edited) search metadata and/or the (possibly edited) search pattern.

FIG. 4.2 shows another view of the GUI (400) that includes a results/pattern tab (420) including a search results button (422) and a search pattern button (424). Selecting (e.g., clicking) the search results button (422) opens a search results window (432). The search results window (432) includes thumbnails corresponding to search results. Each search result is a portion of the image matching the search pattern. A tooltip may be used to open a new window containing search metadata corresponding to the respective matching portion of the image, where the search metadata may be edited in the new window. Selecting a result thumbnail in the search results window (432) and clicking a "visit" button may open a new window to display the selected result.

The search pattern button (424), when selected, opens a search pattern window (434). The search pattern window (434) includes thumbnails corresponding to previously captured or saved search patterns. Various functions may be performed on the search patterns, including:

1) Editing a selected search pattern.
2) Editing search metadata corresponding to a selected search pattern. A tooltip may be used to open a new window containing search metadata corresponding to the selected search pattern, where the search metadata may be edited in the new window.
3) Saving a selected search pattern.

Embodiments of the disclosure may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (500) in FIG. 5.1 may be connected to or be a part of a network. For example, as shown in FIG. 5.2, the network (520) may include multiple nodes (e.g., node X (522), node Y (524)). A node may correspond to a computing system, such as the computing system shown in FIG. 5.1, or a group of nodes combined may correspond to the computing system shown in FIG. 5.1. By way of an example, embodiments of the disclosure may be implemented on a node of a distributed system that is connected to other nodes. By way of another example, embodiments of the disclosure may be implemented on a distributed computing system having multiple nodes, where a portion of the disclosure may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the disclosure.

The computing system or group of computing systems described in FIGS. 5.1 and 5.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where a token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the disclosure, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5.1 and the nodes and/or client device in FIG. 5.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method comprising:
    displaying, in a graphical user interface (GUI) of a display device, a first image generated from a first well log;
    receiving, via the GUI, a selection of a portion of the first image, wherein the portion of the first image displays values of a first well log channel of the first well log;
    obtaining, for the portion of the first image, first search metadata, wherein the first search metadata corresponds to a second well log channel of the first well log, and wherein the portion of the first image excludes values of the second well log channel;
    deriving, from the portion of the first image, a search pattern comprising a constraint on a value of a search parameter, wherein the search parameter corresponds to the first well log channel;
    performing, using the search pattern, a first search within the first image;
    obtaining a first plurality of search results comprising a plurality of portions of the first image matching the search pattern;
    marking, in the GUI, locations of the first plurality of search results within the first image;
    receiving, via the GUI, a selection of a search result of the first plurality of search results; and
    presenting, in the GUI, the search result.

2. The method of claim 1, further comprising:
    training a recommendation model using historical search patterns comprising a plurality of values of the search parameter, the historical search patterns each labeled with search metadata; and
    before performing the first search, recommending, by the recommendation model and using the first search metadata, a modification to the search pattern that modifies the constraint on the value of the search parameter.

3. The method of claim 1, wherein the first search metadata is obtained via the GUI, the method further comprising:
    training a recommendation model using historical search patterns comprising a plurality of values of the search parameter, the historical search patterns each labeled with search metadata; and
    before performing the first search, recommending, by the recommendation model and using the search pattern, a modification to the first search metadata.

4. The method of claim 1, further comprising:
    saving, in a search pattern repository, the search pattern and the first search metadata;
    displaying, in the GUI, a second image generated from a second well log;
    receiving, for the second image and via the GUI, second search metadata;
    determining, by querying the search pattern repository with the second search metadata, that the second search metadata is similar to the first search metadata; and
    in response to determining that the second search metadata is similar to the first search metadata:
        retrieving, from the search pattern repository and using the first search metadata, the search pattern, and
        making a proposal, via the GUI, to perform a second search within the second image using the search pattern.

5. The method of claim 4, further comprising:
    receiving, via the GUI, an acceptance of the proposal;
    in response to receiving the acceptance, performing, using the search pattern, the second search of the second image; and
    obtaining a second plurality of search results comprising a plurality of portions of the second image matching the search pattern.

6. The method of claim 4, further comprising:
obtaining, from the search pattern repository, a plurality of search metadata comprising the first search metadata; and
calculating a plurality of similarity scores between the second search metadata and the plurality of search metadata, wherein the second search metadata is determined to be similar to the first search metadata using the plurality of similarity scores.

7. The method of claim 1, wherein the first well log comprises one or more properties of a wellbore in a geological formation.

8. A computer system comprising:
a computer processor;
a data repository configured to store a plurality of images generated from a plurality of well logs, the plurality of images comprising a first image generated from a first well log of the plurality of well logs; and
memory accessible by the computer processor, the memory storing instructions for a search pattern engine that, when executed by the computer processor, cause the computer processor to:
display, in a graphical user interface (GUI) of a display device, the first image,
receive, via the GUI, a selection of a portion of the first image, wherein the portion of the first image displays values of a first well log channel of the first well log,
obtain, for the portion of the first image, first search metadata, wherein the first search metadata corresponds to a second well log channel of the first well log, and wherein the portion of the first image excludes values of the second well log channel,
derive, from the portion of the first image, a search pattern comprising a constraint on a value of a search parameter, wherein the search parameter corresponds to the first well log channel,
perform, using the search pattern, a first search within the first image,
obtain a first plurality of search results comprising a plurality of portions of the first image matching the search pattern,
mark, in the GUI, locations of the first plurality of search results within the first image,
transmit the first plurality of search results,
receive, via the GUI, a selection of a search result of the first plurality of search results, and
present, in the GUI, the search result.

9. The computer system of claim 8, further comprising a recommendation model, wherein the search pattern engine is further configured to:
train the recommendation model using historical search patterns comprising a plurality of values of the search parameter, the historical search patterns each labeled with search metadata, and
before performing the first search, recommend, by the recommendation model and using the first search metadata, a modification to the search pattern that modifies the constraint on the value of the search parameter.

10. The computer system of claim 8, further comprising a recommendation model, wherein the first search metadata is obtained via the GUI, and wherein the search pattern engine is further configured to:
train the recommendation model using historical search patterns comprising a plurality of values of the search parameter, the historical search patterns each labeled with search metadata, and
before performing the first search, recommend, by the recommendation model and using the search pattern, a modification to the first search metadata.

11. The computer system of claim 8, wherein the search pattern engine is further configured to:
save, in a search pattern repository, the search pattern and the first search metadata,
display, in the GUI, a second image generated from a second well log,
receive, for the second image and via the GUI, second search metadata,
determine, by querying the search pattern repository with the second search metadata, that the second search metadata is similar to the first search metadata, and
in response to determining that the second search metadata is similar to the first search metadata:
retrieve, from the search pattern repository and using the first search metadata, the search pattern, and
make a proposal, via the GUI, to perform a second search within the second image using the search pattern.

12. The computer system of claim 11, wherein the search pattern engine is further configured to:
receive, via the GUI, an acceptance of the proposal,
in response to receiving the acceptance, perform, using the search pattern, the second search of the second image, and
obtain a second plurality of search results comprising a plurality of portions of the second image matching the search pattern.

13. The computer system of claim 11, wherein the search pattern engine is further configured to:
obtain, from the search pattern repository, a plurality of search metadata comprising the first search metadata, and
calculate a plurality of similarity scores between the second search metadata and the plurality of search metadata, wherein the second search metadata is determined to be similar to the first search metadata using the plurality of similarity scores.

14. The computer system of claim 8, wherein the first well log comprises one or more properties of a wellbore in a geological formation.

15. A non-transitory computer readable storage medium comprising computer readable program code, when executed by a processor, causes a computer system to:
display, in a graphical user interface (GUI) of a display device, a first image generated from a first well log;
receive, via the GUI, a selection of a portion of the first image, wherein the portion of the first image displays values of a first well log channel of the first well log;
obtain, for the portion of the first image, first search metadata, wherein the first search metadata corresponds to a second well log channel of the first well log, and wherein the portion of the first image excludes values of the second well log channel;
derive, from the portion of the first image, a search pattern comprising a constraint on a value of a search parameter, wherein the search parameter corresponds to the first well log channel;
perform, using the search pattern, a first search within the first image;
obtain a first plurality of search results comprising a plurality of portions of the first image matching the search pattern;
mark, in the GUI, locations of the first plurality of search results within the first image;

receive, via the GUI, a selection of a search result of the first plurality of search results; and present, in the GUI, the search result.

16. The non-transitory computer readable storage medium of claim 15, wherein the computer readable program code, when executed by the processor, further causes the computer system to:

train a recommendation model using historical search patterns comprising a plurality of values of the search parameter, the historical search patterns each labeled with search metadata; and before performing the first search, recommend, by the recommendation model and using the first search metadata, a modification to the search pattern that modifies the constraint on the value of the search parameter.

17. The non-transitory computer readable storage medium of claim 15, wherein the computer readable program code, when executed by the processor, further causes the computer system to:

train a recommendation model using historical search patterns comprising a plurality of values of the search parameter, the historical search patterns each labeled with search metadata; and before performing the first search, recommend, by the recommendation model and using the search pattern, a modification to the first search metadata.

18. The non-transitory computer readable storage medium of claim 15, wherein the computer readable program code, when executed by the processor, further causes the computer system to:

save, in a search pattern repository, the search pattern and the first search metadata;

display, in the GUI, a second image generated from a second well log;

receive, for the second image and via the GUI, second search metadata;

determine, by querying the search pattern repository with the second search metadata, that the second search metadata is similar to the first search metadata; and in response to determining that the second search metadata is similar to the first search metadata:

retrieve, from the search pattern repository and using the first search metadata, the search pattern, and make a proposal, via the GUI, to perform a second search within the second image using the search pattern.

19. The non-transitory computer readable storage medium of claim 18, wherein the computer readable program code, when executed by the processor, further causes the computer system to:

receive, via the GUI, an acceptance of the proposal;

in response to receiving the acceptance, perform, using the search pattern, the second search of the second image; and obtain a second plurality of search results comprising a plurality of portions of the second image matching the search pattern.

20. The non-transitory computer readable storage medium of claim 18, wherein the computer readable program code, when executed by the processor, further causes the computer system to:

obtain, from the search pattern repository, a plurality of search metadata comprising the first search metadata; and calculate a plurality of similarity scores between the second search metadata and the plurality of search metadata, wherein the second search metadata is determined to be similar to the first search metadata using the plurality of similarity scores.

* * * * *